3,119,747
FUEL ELEMENT
Walter P. Wallace, Encinitas, and Massoud T. Simnad, San Diego, Calif., assignors to General Dynamics Corporation, New York, N.Y., a corporation of Delaware
Filed June 8, 1960, Ser. No. 34,667
6 Claims. (Cl. 176—71)

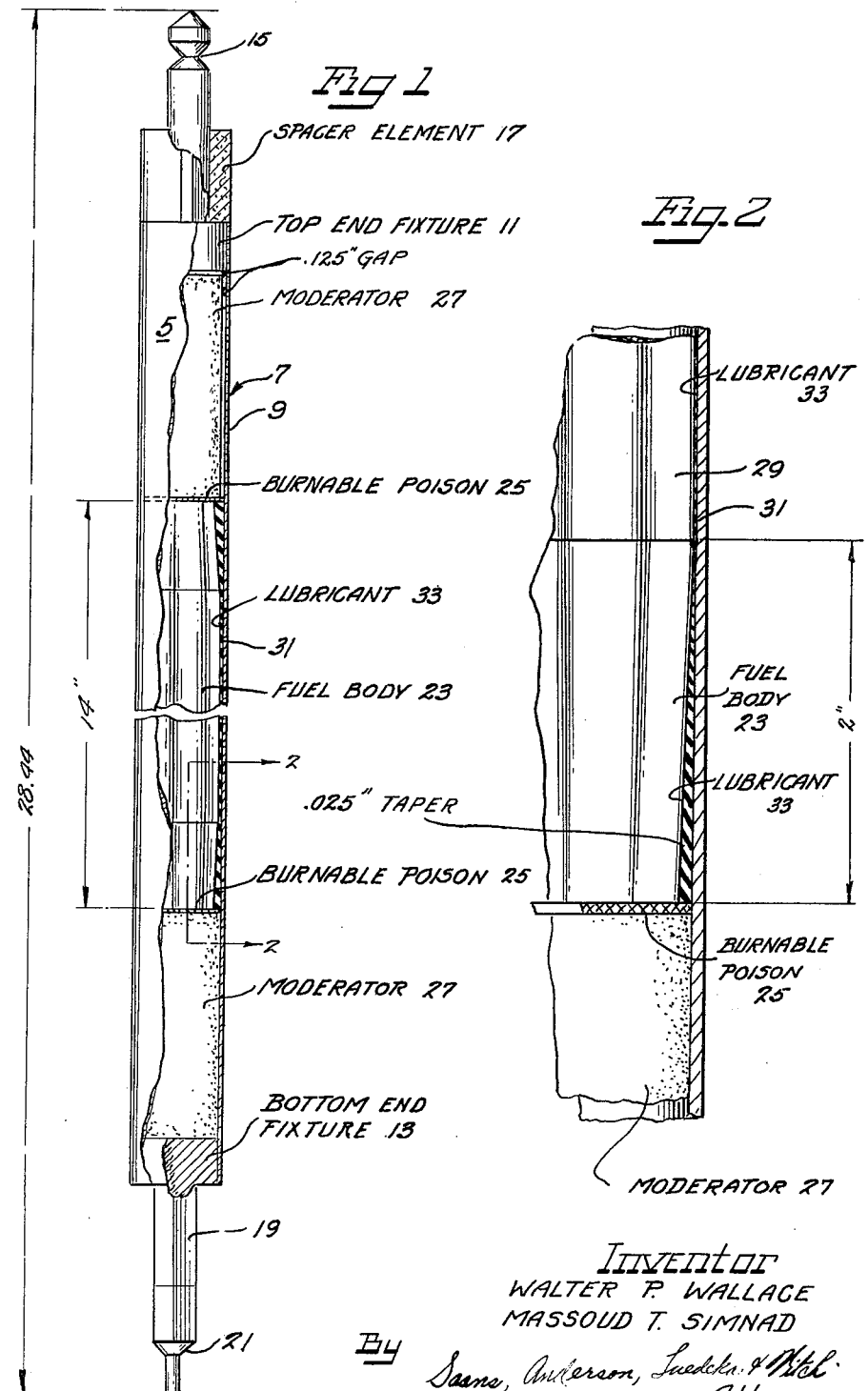

The present invention generally relates to the construction of fuel elements and more particularly relates to an improved fuel element for use in a nuclear reactor.

One form of fuel element for a nuclear reactor comprises a solid fuel body of fissile material or mixture of fissile and fertile material, with or without other substances, such as moderating materials. The fuel body is enclosed in a closely fitting metallic container adapted to provide good thermal conductivity and to retard the escape of fission products therefrom.

Fuel elements of the described type have been used in nuclear reactors. However, under certain extreme conditions of use difficulties have occasionally arisen. For example, it has been found that if the nuclear reactor is repeatedly flashed, i.e., subjected to a sudden large power surge, as by withdrawing all or a portion of the control rods from the reactor core, measurable dimensional changes may occur in the fuel elements. Specifically, substantial permanent elongation of the fuel element container may take place.

It is believed that the observed elongation of the fuel element container is due, at least in part, to the difference in thermal expansion between the fuel body and the metallic container during the rapid heating of the fuel body which occurs during flashing.

Whatever the actual mechanism involved, the fuel element container is elongated and if elongated to too great a degree, the container may fail. This will result in contamination of the reactor system.

Accordingly, it is the principal object of the invention to provide an improved fuel element construction. It is also an object of the invention to provide an improved fuel element having a minimized elongation incident to thermal cycling produced by repeated power surges of a reactor in which the fuel element is utilized.

Other objects and advantages of the invention will become apparent by reference to the following detailed description and to the accompanying drawings in which:

FIGURE 1 is a schematic side elevation of one embodiment of a nuclear fuel element incorporating certain features of the present invention, portions being broken away to reveal the internal construction threof; and FIGURE 2 is an enlarged fragmentary view of a part of the embodiment set forth in FIGURE 1.

The present invention generally comprises an improved nuclear fuel element. More particularly the fuel element comprises a solid fuel body and a closely fitting container disposed therearound, said fuel element containing certain novel features which reduce the tendency of the container to irreversibly elongate.

Now referring more particularly to the accompanying drawings, FIGURE 1 illustrates one embodiment of a nuclear fuel element incorporating various features of the present invention. In FIGURE 1, the fuel element 5 is formed of a hollow, closed, generally cylindrical metallic container 7 having a sidewall 9, the top and bottom ends of which are secured to top end fixture 11 and bottom end fixture 13, respectively, secured thereto as by welding, etc.

The top end fixture 11 may include an annular groove 15, as shown, engageable by a lifting assembly (not shown) for moving the fuel element to and from a reactor core (not shown). A reactor core which may utilize fuel elements of the type described is set forth in co-pending application, Serial No. 825,089 to Koutz filed July 6, 1959.

A spacer element 17 encircles the top end fixture for lateral positioning of the fuel element. The bottom end fixture 13 may include a central projection 19 having an inwardly tapered shoulder 21 which is adapted to be seated on a lower grid plate (not shown).

The sidewall 9 of the container 7 is closely disposed around a fuel body 23. Wafers 25 of burnable poison may also be disposed on either side of the fuel body, and cylinders 27 of moderator may be disposed between the wafers and the respective end fixtures, as shown in FIGURE 1.

The fuel body 23 may comprise a solid fissile material, with or without fertile material, and also with or without a solid moderator mixed therewith, for example a homogeneous mixture of uranium 238, uranium 235, and zirconium hydride as moderator. Beryllium, beryllium oxide, graphite or other moderator can be used for the cylinders 27.

The fuel element is provided with certain novel features which substantially reduce the tendency of the container 7 to irreversibly deform during flashing or other high temperature heating in a reactor core in which the fuel element is disposed.

Referring more particularly to FIGURE 2, it will be noted that the outer surface 29 of the fuel body adjacent the inner surface 31 of the container is very smooth, the surface irregularities thereof having been substantially reduced so that the fuel body 23 has a polish or smoothness of, for example, within the range of from about 10 to 20 micro-inches (average height of surface irregularities). The inner surface 31 of the container 7, particularly that portion adjacent the fuel body, is also smooth, so that there is little frictional contact at the interface of the fuel body and container when the fuel element is flashed, although the container closely fits around the fuel body. Moreover, a suitable gap of, for example, about ⅛ inch is preferably provided between the container and one or more components within the container. Thus, the top end fixture and adjacent moderator 27 may be separated by a gap which also extends between the cylinder sidewall and container and which permits expansion of the fuel body and the components within the container without deformation of the container.

As illustrated in FIGURE 1, the shape of the fuel body is generally cylindrical. However, the area of surface contact, i.e., the area of the interface between the fuel body and the container, is reduced. In this regard, the diameter of the fuel body is reduced at its ends. Preferably, the ends of the fuel body are tapered inwardly, as illustrated in FIGURE 2. The degree of taper of the ends of the fuel body can be substantially varied. However, for example, it has been found that in a fuel element having a fuel body length of approximately 14 inches a very small taper of approximately 0.025 inch over a distance of approximately 2 inches at each end of the fuel body is sufficient to reduce the tendency of the container to irreversibly elongate.

The fuel element also preferably includes a high temperature lubricant 33 disposed between the fuel body 23 and container 7, particularly between the sidewall 9 and adjacent fuel body surface 29. For example, colloidal graphite capable of withstanding reactor temperatures as high as 2000° C. or more and still functioning as a lubricant can be utilized. Other lubricants having suitable heat stability, radiation stability and lubricating properties may be employed in place of or in addition to the colloidal graphite, such as molybdenum disulfide.

In addition, the container for the fuel element is preferably fabricated of aluminum which has been annealed.

Thus, annealed aluminum tubing can be utilized, the annealing, for example, comprising heating the aluminum to about 700° F. within from about 5 to about 60 minutes, then air cooling the aluminum, for example, about 30 minutes to ambient temperature. Less preferably, the annealing can be carried out on the fabricated container before or after assembly of the fuel element. Annealed aluminum more strongly resists cracking than does unannealed aluminum in the fuel element.

During fabrication of the fuel element by any suitable procedure, such as that set forth in copending United States Patent Nos. 3,010,889 and 3,087,877, at an appropriate fabrication stage the ends of the fuel body can be tapered to the desired extent, as by conventional metal forming and/or shaping operations, e.g., extruding, pressing, grinding, etc.

In addition thereto or alternatively, smoothing of the surface of the fuel body, particularly that which is to be adjacent the sidewall of the container in the assembled fuel element, can be carried out utilizing conventional smoothing techniques, i.e. polishing, buffing, etc., until a polish of desired degree, for example, between about 10 and about 20 micro-inches, is obtained. If desired, the inner sidewall of the container can also be smoothed to a high degree of polish.

Alternatively or additionally, lubrication of the outer surface of the fuel body and/or the inner surface of the container can be carried out by applying thereto a coating, preferably thin, for example, less than 0.005 inch thick, of a suitable high temperature stable lubricant such as molybdenum disulfide. The fuel body and container usually are dimensioned for a relatively close fit. Accordingly, the lubricant aids when the fuel body is inserted into the container before the end fixtures are secured in place.

After inserting the fuel body into the container, the remaining components, i.e., wafers and moderator cylinders are assembled into the container and the container is sealed at both ends by application of the top and bottom end fixtures thereto, as by welding, etc., to provide the fuel element. The top end fixture, top moderator cylinder and container are dimensioned with respect to each other so that the previously described gap is provided for internal expansion. It will be understood that various supplementary procedures can be employed during final fabrication and assembly of the fuel element.

Following the described final assembling of the components, the fuel element may be inspected for leaks and the like, the dimensions thereof may be rechecked and, then as a final step, the container may be further treated, if desired, as by anodizing the same, in order to retard deterioration thereof in use.

A particularly satisfactory fuel element for use in a neutronic reactor such as that disclosed in co-pending application, Serial No. 825,089 filed July 6, 1959, has a fuel body approximately 1.42 inches in diameter and 14 inches long, the overall length of the fuel element being 28.44 inches. There are two cylinders of graphite moderator, each about 4 inches long and two very thin wafers of a burnable poison.

The fuel body comprises an alloy of 8 weight percent uranium 238 (enriched to approximately 20 percent in uranium 235) and 92 weight percent zirconium hydride, of hydrogen-to-zirconium ratio of 1.0:1. The cylindrical fuel body has a machined taper of about 0.025 inch over a 2 inch length.

The fuel body also has a buffed and polished finish of about 16 micro-inches and a thin coating of colloidal graphite or molybdenum disulfide. The fuel body is enclosed in a thin (0.030 inch thickness) closely fitting annealed aluminum tube, sealed at each end by an aluminum end fixture.

Fuel elements of the type described when assembled in a typical nuclear reactor core (containing 59 fuel elements) exhibit during repeated flashings a substantially reduced tendency to irreversibly elongate. No cracks or fissures in any of the fuel elements are observed over a period of as many as 700 flashes of variable intensity, whereas some fuel elements constructed in an identical manner, except for the taper, polish and lubrication features and the annealed aluminum and expansion gap characteristics exhibit irreversible elongations of up to 1 inch or more, and substantial cracking under the same conditions.

Accordingly, the fuel elements of the present invention exhibit improved safety and durability with substantial reductions in irreversible elongation and cracking of the fuel element containers.

It will be understood that although the foregoing description has been particularly directed to a single embodiment of a solid fuel element for a nuclear reactor, the present invention also extends to other nuclear fuel elements.

Various of the features of the present invention believed to be new are set forth in the appended claims.

What is claimed is:

1. An improved nuclear fuel element, said fuel element comprising a solid elongated generally cylindrical fuel body and a closed, fluid tight, metallic container disposed around said fuel body and spaced at least from one end thereof, the side wall of said container being in intimate contact with the central portion of side wall of said fuel body, said fuel body having an inwardly directed tapered portion at both ends thereof, thereby providing a gap between said fuel body and container in the areas of the tapered portions, whereby the tendency of said container to irreversibly elongate during expansion and contraction of said fuel body is reduced.

2. An improved nuclear fuel element, said fuel element comprising a solid, elongated, generally cylindrical fuel body and a closed, fluid tight, metallic container disposed around said fuel body and spaced from at least one end thereof, the side wall of said container being in intimate contact with the central portion of the side wall of said fuel body, the side wall of said fuel body having a polish of from about ten to about twenty micro-inches, said fuel body having an inwardly directed tapered portion at both ends thereof, thereby providing a gap between said fuel body and container in the areas of said tapered portions, whereby the tendency of said container to irreversibly elongate during expansion and contraction of said fuel body is reduced.

3. An improved nuclear fuel element, said fuel element comprising a solid, elongated, generally cylindrical fuel body and a closed metallic container disposed around said fuel body and spaced from at least one end thereof, the side wall of said container closely fitting around the side wall of said fuel body, a coating of material which is a lubricant at room temperature and also at nuclear reactor operating temperatures disposed between the side wall of said fuel body and said container, said fuel body having an inwardly directed tapered portion adjacent both ends thereof, thereby providing a gap between said fuel body and container in the areas of said tapered portions, whereby the tendency of said container to irreversibly elongate during expansion and contraction of said fuel body is reduced.

4. An improved nuclear fuel element, said fuel element comprising a solid, elongated, generally cylindrical fuel body and a closed metallic container disposed around said fuel body and spaced from at least one end thereof, the side wall of said container closely fitting around the side wall of said fuel body, a coating comprising colloidal graphite disposed between the side wall of said fuel body and said container, said fuel body having an inwardly directed tapered portion adjacent both ends thereof, thereby providing a gap between said fuel body and container in the areas of said tapered portions, whereby the tendency of said container to irreversibly elongate during expansion and contraction of said fuel body is reduced.

5. An improved nuclear fuel element, said fuel element comprising a solid, elongated, generally cylindrical fuel body and a closed metallic container disposed around said fuel body and spaced from at least one end thereof, the side wall of said container closely fitting around the side wall of said fuel body, the side wall of said fuel body having a polish of from about ten to about twenty microinches, a coating of material which is a lubricant at room temperature and also at nuclear reactor operating temperatures disposed between the side wall of said fuel body and said container, said fuel body having an inwardly directed tapered portion adjacent both ends thereof, thereby providing a gap between said fuel body and said container in the areas of said tapered portions, whereby the tendency of said container to irreversibly elongate incidental to expansion and contraction of said fuel body is reduced.

6. An improved nuclear fuel element, said fuel element comprising a solid, elongated, generally cylindrical fuel body and a closed metallic container disposed around said fuel body and spaced from at least one end thereof, the side wall of said container closely fitting around the side wall of said fuel body, the side wall of said fuel body having a polish of from about ten to about twenty microinches, a coating of colloidal graphite disposed between the side wall of said fuel body and said container, said fuel body having an inwardly directed tapered portion adjacent both ends thereof, thereby providing a gap between said fuel body and said container in the areas of said tapered portions, whereby the tendency of said container to irreversibly elongate during expansion and contraction of said fuel body is reduced.

References Cited in the file of this patent

UNITED STATES PATENTS

| | | |
|---|---|---|
| 2,799,642 | Hurwitz, et al. | July 16, 1957 |
| 2,838,452 | West et al. | June 10, 1958 |
| 2,848,800 | Maloney et al. | Aug. 26, 1958 |
| 2,929,707 | Weeks | May 22, 1960 |
| 2,967,811 | Flint | Jan. 10, 1961 |

FOREIGN PATENTS

| | | |
|---|---|---|
| 773,021 | Great Britain | Apr. 17, 1957 |
| 773,771 | Great Britain | May 1, 1957 |
| 802,805 | Great Britain | Oct. 15, 1958 |
| 802,806 | Great Britain | Oct. 15, 1958 |
| 1,051,424 | Germany | Feb. 26, 1959 |
| 1,200,408 | France | June 29, 1959 |